United States Patent
Kibler

(10) Patent No.: US 7,685,513 B2
(45) Date of Patent: Mar. 23, 2010

(54) OPTIMIZATION OF STORAGE AND DELIVERY OF MARKUP LANGUAGE FILES

(75) Inventor: Wendell L. Kibler, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1009 days.

(21) Appl. No.: 11/379,090

(22) Filed: Apr. 18, 2006

(65) Prior Publication Data

US 2007/0245231 A1 Oct. 18, 2007

(51) Int. Cl.
*G06F 17/30* (2006.01)
*G06F 17/40* (2006.01)

(52) U.S. Cl. .................... 715/235; 715/236; 715/249

(58) Field of Classification Search .............. 715/235, 715/236, 249
See application file for complete search history.

(56) References Cited

U.S. PATENT DOCUMENTS

| | | | | |
|---|---|---|---|---|
| 6,023,714 | A * | 2/2000 | Hill et al. ................... | 715/235 |
| 6,589,291 | B1 * | 7/2003 | Boag et al. ................. | 715/235 |
| 7,134,073 | B1 * | 11/2006 | Fiedorowicz et al. ...... | 715/235 |
| 7,383,498 | B1 * | 6/2008 | Hickl et al. ................. | 715/235 |
| 2002/0025085 | A1 | 2/2002 | Gustafson et al. | |
| 2002/0138526 | A1 * | 9/2002 | Crawford et al. .......... | 707/530 |
| 2005/0160065 | A1 | 7/2005 | Seeman | |
| 2005/0216923 | A1 | 9/2005 | Krebs | |
| 2005/0268230 | A1 | 12/2005 | Bales | |
| 2006/0174188 | A1 * | 8/2006 | White ..................... | 715/501.1 |
| 2007/0240041 | A1 * | 10/2007 | Pearson .................... | 715/522 |

FOREIGN PATENT DOCUMENTS

| | | |
|---|---|---|
| EP | 1416397 A | 6/2004 |
| EP | 1484675 A | 12/2004 |
| WO | WO 0163481 A2 * | 8/2001 |
| WO | WO0163481 A2 | 8/2001 |
| WO | WO03042835 A1 | 5/2003 |

OTHER PUBLICATIONS

20051928-EP-EPA, European Search Report, Mar. 20, 2008.

* cited by examiner

*Primary Examiner*—Adam L Basehoar
*Assistant Examiner*—Yasin Patterson
(74) *Attorney, Agent, or Firm*—Gibb I.P. Law Firm, LLC

(57) ABSTRACT

A method receives a request at a server from a browser for at least one markup language page. The method can then determine which CSS classes are used with the requested markup language page using a usage map. Then, the method loads the markup language page and loads only the CSS classes that are used with the markup language page to the browser.

10 Claims, 4 Drawing Sheets

OPTIMIZATION OF STORAGE AND DELIVERY OF MARKUP LANGUAGE FILES

BACKGROUND

Embodiments herein generally relate to loading markup language files from a server to a browser and more particularly to a methodology that increases speed and reduces the demand on computing resources when so processing and storing such files.

In recent years web based applications have migrated to a model-view-controller architecture. The view portion of this architecture has been largely dominated by the use of Cascading Style Sheet (CSS) classes that layout UI widgets and format various displayable objects. Most browsers now support rich CSS capability so that almost no "view" information is required in the markup page. Instead, the markup page is required to make requests to the server to load a set of CSS classes which supply the formatting for the page. For a more detailed discussion and examples of the use of CSS classes see U.S. Patent Publications 2002/0025085, 2005/0160065, and 2005/0268230 (the complete disclosures of which are incorporated herein by reference).

Conventionally, when the browser receives these CSS classes the browser must parse the classes and apply them appropriately to the various viewable objects before the browser displays the page. This cycle of loading a page, loading the CSS classes, parsing the classes and then applying them to viewable objects is repeated for each page that is displayed. Frequently, large numbers of CSS classes are stored in a single file that is then loaded into several markup language pages. Sometimes several CSS files must be loaded into a single markup language page to access the desired CSS classes. Frequently some classes loaded aren't even used on the requesting page. The end result is that the browser most likely has to expend more processing cycles loading and parsing CSS classes than is necessary to perform the job that is needed. This typically is not a problem in the average desktop environment; however, when the browser and server are running in the same inexpensive, under-powered, embedded processor with limited memory and no disk, this can contribute to potential user interface performance problems.

SUMMARY

The embodiments herein describe a process that will guarantee each markup language page will automatically receive the minimum set of cascading style sheet (CSS) classes that are required to display the page, and not CSS classes that are not required. All required classes can be loaded using a single load request from the browser to the server. This is accomplished while reducing the processing requirements of the browser and minimizing the memory footprint required to store the CSS class data.

Embodiments herein include a method of processing CSS classes used with markup language pages. The method eliminates duplicate CSS classes that have the same name and the same properties, eliminates homonym CSS classes that have the same names but different properties, eliminates synonym CSS classes that have the same properties but different names, and eliminates unused CSS classes that are not used by any markup language page. The method also logs a usage map that identifies CSS classes used by each markup language page and this log is used to create a page-class definition file which lists all CSS classes (that are available to the server) that are used by each different markup language page (that are available to the server).

After the above processing (and potentially during or before the above processing), the method receives a request at a server from a browser for at least one of the markup language pages. The method can then determine which CSS classes are used with the requested markup language page using the page-class definition file. Then, the method loads the markup language page and loads only the CSS classes that are used with the markup language page to the browser.

When the server is loading the data that is used to generate the CSS classes, the method loads only one instance of each CSS class. Further, each CSS class comprises at least one property and the loading of the CSS data further comprises loading only one instance of each property. All of the CSS classes that are used with the markup language page can be loaded to the browser using a single load request from the browser. The CSS classes provide formatting information for the markup language page.

This allows the browser to apply the CSS classes to viewable objects within the markup language page and to display the markup language page without having to process duplicate, homonym, synonym, or unused CSS classes. Further, otherwise appropriate CSS classes that are not used by the requested markup language page are also not processed. By eliminating such CSS classes from the processing, the limited resources (memory, etc.) of the browser and server are used more efficiently, thereby increasing speed and decreasing the need for additional, faster and more expensive processors with larger memories.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

The embodiments herein comprise a method of organizing CSS classes so that class attributes and classes are only defined once, regardless of the number of pages that reference them. This reduces the amount of memory required to host the CSS classes. The embodiments herein also guarantee that only the minimum set of classes that are needed on a page are served to the browser thereby reducing the over head of handling unused classes.

There are two components to this process a pre-processing component and a runtime component. The CSS pre-processing component scans the markup language pages for CSS references and generates usage reports. The runtime server component uses a very fast algorithm for generating the browser readable CSS classes from their compressed format.

The process described below is designed to optimize performance and help developers manage the creation of CSS classes. One can quickly tell if a recently defined class has been previously defined by another developer, or if a class name is duplicated with different properties. Also when the markup language changes, this may obsolete previously defined classes. One of the most difficult situations to debug is when the same class name has been defined but with different properties. The CSS optimize log files will report these situations early and allow them to be eliminated before any debug effort is expended.

Figure 1:
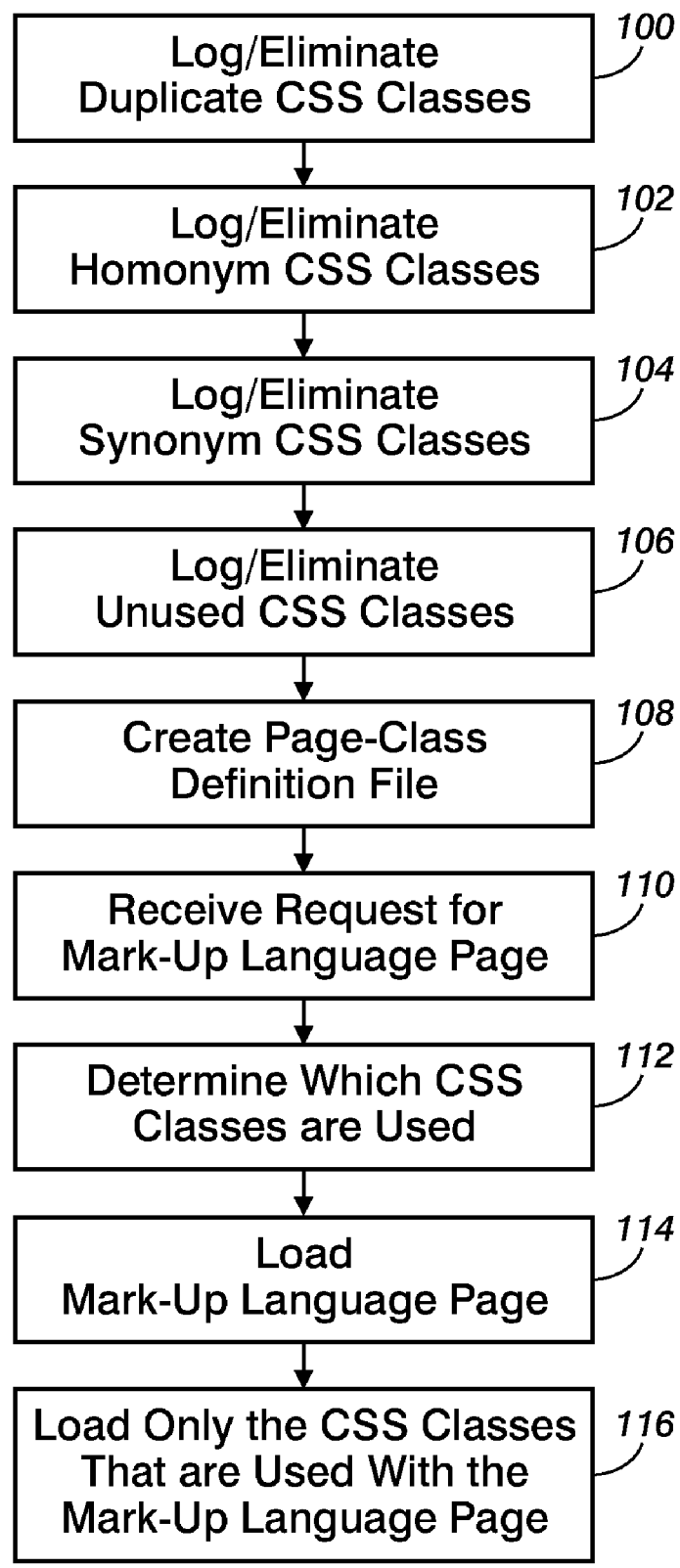
FIG. 1 is a flow diagram illustrating one method embodiment.

As shown in FIG. 1, one embodiment herein provides a method of processing cascading style sheet (CSS) classes used with markup language pages. The method logs and/or eliminates duplicate CSS classes that have the same name and the same properties, in item 100; logs and/or eliminates homonym CSS classes that have the same names but different properties, in item 102; logs and/or eliminates synonym CSS classes that have the same properties but different names, in item 104; and logs and/or eliminates unused CSS classes that are not used by any markup language in item 106. The method also logs a usage map that identifies CSS classes used by each markup page and uses this log to create a page-class definition file in item 108. These processing points generally make up the CSS pre-processing component.

After the above pre-processing (and potentially during or before the above processing), the runtime component of the method receives a request at a server from a browser for at least one of the markup language pages in item 110. The method can then determine which CSS classes are used with the requested markup language page using the page-class definition file in item 112. Then, the method loads the markup language page (item 114) and loads only the CSS classes that are used with the markup language page to the browser, in item 116.

When loading the CSS classes in item 116, the method loads only one instance of each CSS class. Further, each CSS class comprises at least one property and the loading of the CSS classes in item 116 further comprises loading only one instance of each of the properties. All of the CSS classes that are used with the markup language page can be loaded to the browser using a single load request (item 110) from the browser. The CSS classes provide formatting information for the markup language page.

This allows the browser to apply the CSS classes to viewable objects within the markup language page and to display the markup language page without having to process duplicate, homonym, synonym, or unused CSS classes. Further, otherwise appropriate CSS classes that are not used by the requested markup language page are also not processed. By eliminating such CSS classes from the processing, the limited resources of the browser and server are used more efficiently, thereby increasing speed and decreasing the need for additional more expensive, faster processors with additional memories.

Figure 2:
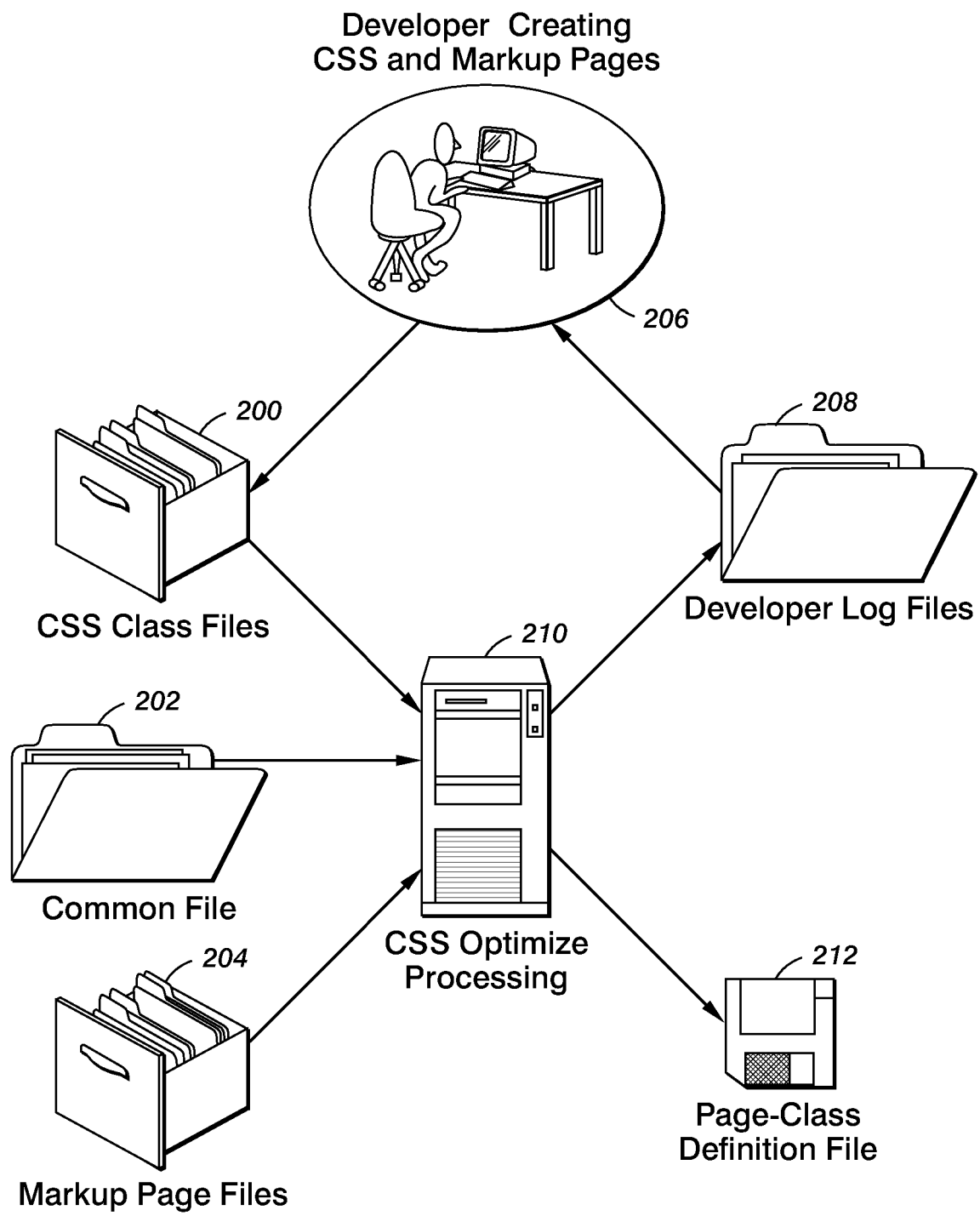
FIG. 2 is a schematic diagram of a system using the embodiments described herein.

FIG. 2 shows the CSS optimize preprocessing component where all the markup language pages 204 available to a given server 210 (which comprises a computer usable data carrier storing instructions to perform the methods described herein) are compared against all the CSS class definitions 200 available to the server 210. Each markup language page is scanned for CSS element class usage. Each CSS class definition file 200 is parsed. The CSS optimize process analyzes these inputs and then reports are generated that are useful to developers 206 to identify problems in their markup language pages or the CSS class definition files 200.

More specifically, the following information is logged in item 206: duplicate classes (classes that use the same name and properties); homonym classes (classes that use the same name but different properties); synonym classes (classes that use different names but use the same properties of a previously defined class); unused classes (classes that are not used by any analyzed markup language page); and a usage map that identifies which pages use which CSS class. In addition, if desired, the embodiments herein can automatically delete or eliminate any duplicate, homonym, synonym, or unused CSS classes.

In addition to the information logs for the developer 206, a file that contains the optimized CSS page-class definitions 212 is generated using the usage map. The CSS page-class definition file 212 is used by the web server to generate the CSS classes that are used by the requested page at run time. The page-class definition file 212 contains the data that is read by the server 210. In a system that uses a large number of CSS classes in many markup language pages, with embodiments herein, the memory footprint is significantly smaller than the CSS files that would conventionally be required to accomplish the same capability.

Figure 3:
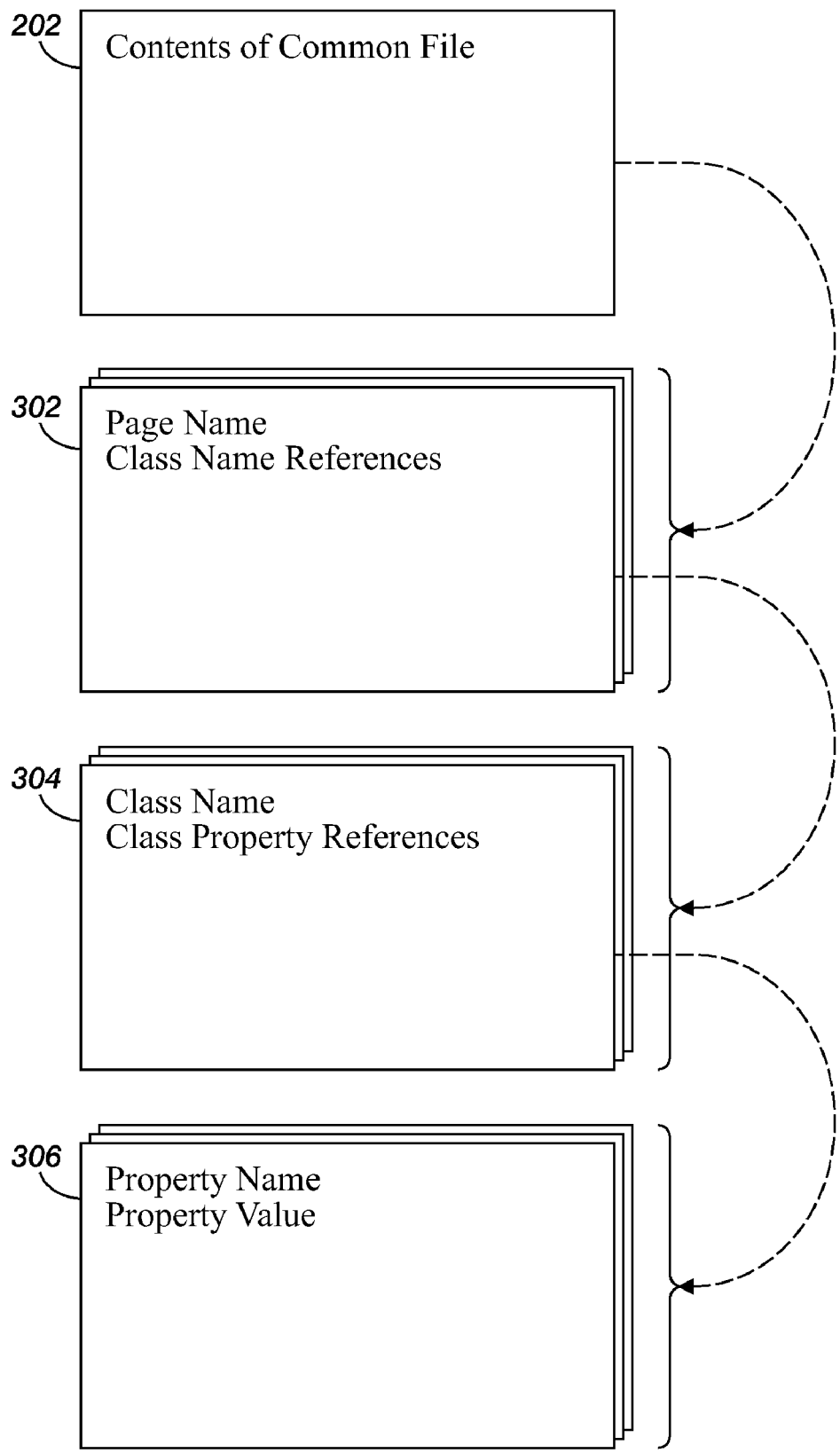
FIG. 3 is a schematic diagram of the page-class definition file shown in FIG. 2.

Also stored in the page-class file 212 is a verbatim copy of the common input file 202, which is shown in greater detail in FIG. 3. The contents of the common file comprises CSS classes that will be served with every page. These classes are not compressed and need no further processing by the server before they are sent to the browser. The remainder of the page-class file comprises at least one page name reference to a page name 302. Each page name 302 has at least one class name reference. Each class name 304 has at least one property name reference. Each property name 306 defines a property value (e.g., format characteristic). Thus, the common input file 202 is used for CSS that cannot be defined with the element class notation in the markup language. Some forms of the CSS Syntax are not applied based on class attributes associated with the elements of the markup language. The CSS instructions are applied based on the state of the markup. This type of CSS syntax is known as pseudo-elements and at times cannot be detected during the preprocessing stage of this method. The common file can be used to define pseudo-elements because they are stored in the server in a non-compressed form and are delivered to each markup page request with no additional processing required, or for CSS classes that are common to all pages. The point is that whatever the developer puts in the common file goes directly to the browser when the CSS information is served, in addition to the page specific CSS classes. This allows the markup page to still receive non-element based CSS instructions.

The runtime component of the CSS Optimize process requires the web server to import the Page-Class definition file and to store it so that the elements can be accessed quickly. The Markup language page when loaded into the browser will reference a CSS document with the same name as the mark page's name. For example if the markup language page reference was http://localhost:8081/myPage.xhtml then the reference to the associated CSS document would be http://localhost:8081/myPage.css This is only an example and different systems could define different mechanisms to access the CSS document.

Figure 4:
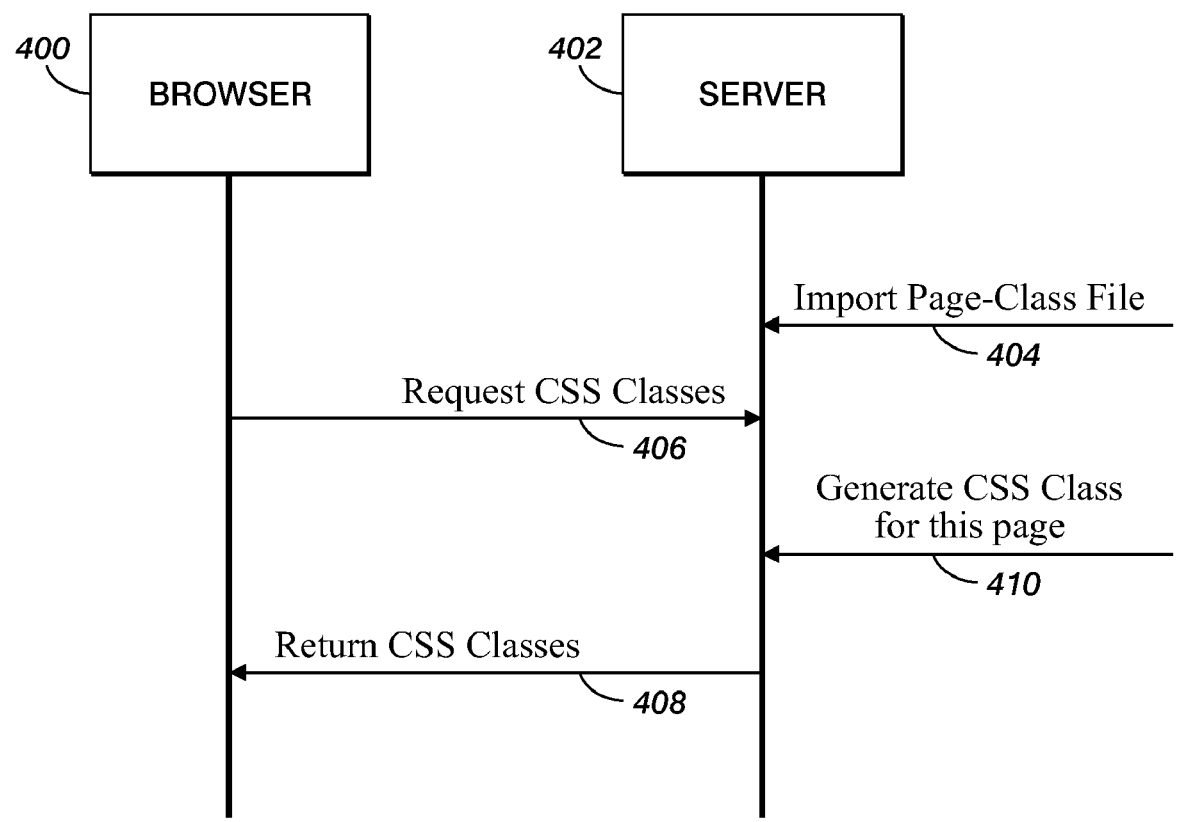
FIG. 4 is a schematic diagram of the runtime environment using the embodiments described herein.

FIG. 4 illustrates the flow between a browser 400 and a server 402. Item 404 represents the process of importing the page-class definition file 212 which, as mentioned above, allows the server 402 to know which classes are associated with each page. Item 406 represents the request for the page (which can be considered a request for CSS classes). In item 410, the server 400 generates the CSS classes for the requested page using the page-class definition file 212. Then, item 408 represents the return of the page and the CSS classes to the browser 400.

Thus, with embodiments herein, once a web server has identified that it is serving a CSS document to a markup language page, it can quickly reference which classes and properties are required and send only the required classes (e.g., the exact set of required classes) to the browser. Some advantages of this approach include that a reduced memory footprint is generated due to the loading of only required CSS classes, one instance of each property, one instance of each class, and because only references to the classes on a per-markup language page basis are made. Further, the embodiments herein reduce processing cycle by the browser, because with embodiments herein, the browser does not have to parse or otherwise process classes that are not used for a given page. Instead, with embodiments herein, only the required classes are provided to the browser. With embodiments herein, more control is provided over CSS class development and there is less chance of introducing conflicting CSS classes due to the logging capabilities mentioned above.

The embodiments herein can be used with any apparatus, such as a digital copier, bookmaking machine, facsimile machine, multi-function machine, etc. which performs a display function for any purpose. This invention is not limited to printers and applies to all systems that use CSS to display/format its User Interface.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A computer-implemented method comprising:
   receiving a request at a server from a browser for at least one markup language page;
   determining, by a computing device, which cascading style sheet (CSS) classes are used with said markup language page;
   logging, by a computing device, duplicate CSS classes that have the same name and the same properties;
   logging, by a computing device, homonym CSS classes that have the same names but different properties;
   logging, by a computing device, synonym CSS classes that have the same properties but different names;
   loading, by a computing device, said markup language page to said browser; and
   loading, by a computing device, only CSS classes that are used with said markup language page to said browser to allow said browser to apply said CSS classes to viewable objects within said markup language page and to display said markup language page.

2. The method according to claim 1, wherein said loading of said CSS classes further comprises loading only one instance of each CSS class.

3. The method according to claim 1, wherein each CSS class comprises at least one property and said loading of said CSS classes further comprises loading only one instance of each said property.

4. The method according to claim 1, wherein said determining comprises referencing a page-class file comprising a list of CSS classes associated with said markup language page.

5. The method according to claim 1, wherein all of said CSS classes that are used with said markup language page are loaded to said browser using a single load request from said browser.

6. A computer-implemented method comprising:
   before receiving a request for a markup language page, processing, by a computing device, cascading style sheet (CSS) classes used with markup language pages in a process comprising:
   logging, by a computing device, duplicate CSS classes that have the same name and the same properties;
   logging, by a computing device, homonym CSS classes that have the same names but different properties;
   logging, by a computing device, synonym CSS classes that have the same properties but different names;
   logging, by a computing device, unused CSS classes that are not used by any markup language page; and
   creating, by a computing device, a page-class definition file that identifies CSS classes used by each said markup language page;
   receiving said request at a server from a browser for at least one said markup language page;
   determining, by a computing device, which CSS classes are used with said markup language page using said page-class definition file;
   loading, by a computing device, said markup language page to said browser; and
   loading, by a computing device, only CSS classes that are used with said markup language page to said browser to allow said browser to apply said CSS classes to viewable objects within said markup language page and to display said markup language page.

7. The method according to claim 6, wherein said loading of said CSS classes further comprises loading only one instance of each CSS class.

8. The method according to claim 6, wherein each CSS class comprises at least one property and said loading of said CSS classes further comprises loading only one instance of each said property.

9. The method according to claim 6, wherein all of said CSS classes that are used with said markup language page are loaded to said browser using a single load request from said browser.

10. The method according to claim 6, wherein said CSS classes provide formatting information for said markup language page.

* * * * *